United States Patent [19]

Chen et al.

[11] Patent Number: 4,904,997
[45] Date of Patent: Feb. 27, 1990

[54] BELTED ELECTRONIC DISPLAY CLINICAL THERMOMETER WITH ALARM

[76] Inventors: Daniel Chen, 2Fl., No. 48, Lane 163, Sec. 5, Yen-Ping N. Rd., Taipei; Houng Y. Liu, No. 193, Yung Mei Rd., Pu Hsin Li, Yang Mei Chen, Tao-Yuean Hsuean, both of Taiwan

[21] Appl. No.: 133,932

[22] Filed: Dec. 17, 1987

[51] Int. Cl.⁴ .................. A61B 5/00; G01K 7/00; G08B 21/00
[52] U.S. Cl. ................. 340/870.17; 128/736; 374/163; 455/100
[58] Field of Search ............ 374/159, 163, 208; 128/736; 455/100; 340/870.16, 870.17

[56] References Cited

U.S. PATENT DOCUMENTS

| | | | |
|---|---|---|---|
| 3,864,976 | 2/1975 | Parker | 374/150 X |
| 3,951,133 | 4/1976 | Reese | 374/162 X |
| 4,041,394 | 8/1977 | Pate | 455/100 |
| 4,129,125 | 12/1978 | Lester et al. | 374/142 X |
| 4,385,289 | 5/1983 | McMillan | 340/586 X |
| 4,450,843 | 5/1984 | Barney et al. | 128/736 X |
| 4,484,181 | 11/1984 | Schwartz | 340/586 X |
| 4,509,531 | 4/1985 | Ward | 374/185 |
| 4,572,197 | 2/1986 | Moore et al. | 128/736 X |
| 4,573,806 | 3/1986 | Moore et al. | 340/870.17 X |
| 4,631,537 | 12/1986 | Neuner et al. | 340/870.17 |
| 4,747,413 | 5/1988 | Bloch | 128/736 |

Primary Examiner—Daniel M. Yasich
Attorney, Agent, or Firm—Bernard R. Gans

[57] ABSTRACT

A combined alarm and display belted clinical thermometer being wound on an arm of a user which comprises a thermal sensor to sense the temperature of the user. The sensing signals are converted and the measured value is displayed on an LCD display. The belted clinical thermometer also comprises a comparator which is preset with a reference value to comparing the measured temperature with a reference temperature and; if the measured temperature is significantly larger than the reference temperature, an alarm is triggered to sound. Further to the basic design, the belted clinical thermometer can be equipped with a transmitter which can signal a remote receiver to sound an alarm.

4 Claims, 3 Drawing Sheets

BELTED ELECTRONIC DISPLAY CLINICAL THERMOMETER WITH ALARM

BACKGROUND OF THE INVENTION

This invention relates to a combined alarm and belted electronic display clinical thermometer which combines a thermal sensor and an alarm so that it is noticeable when a user has a fever.

A belted electronic clinical thermometer never has been found on the market. In the past, a patient's temperature was usually measured by a cylindrical mercury clinical thermometer. In usage, it was necessary to put the mercury clinical thermometer in the patient's mouth, hold it in the patient's armpit or insert it into the patient's anus which was not convenient and not absolutely accurate, especially when used for a baby or a child, because children tend to be restless.

SUMMARY OF THIS INVENTION

Therefore, a primary object of this invention is to provide a belted electronic display clinical thermometer with alarm which combines a thermal sensor and an alarm so that if the user has a fever, the clinical thermometer will sound to notify the patient or the person examining the patient.

Another object of this invention is to provide a belted electronic clinical thermometer with display and alarm used to be wound on the patient's arm, so as to make a more accurate measurement.

DETAILED DESCRIPTION OF THE PREFERRED EMBODIMENT

Figure 1:
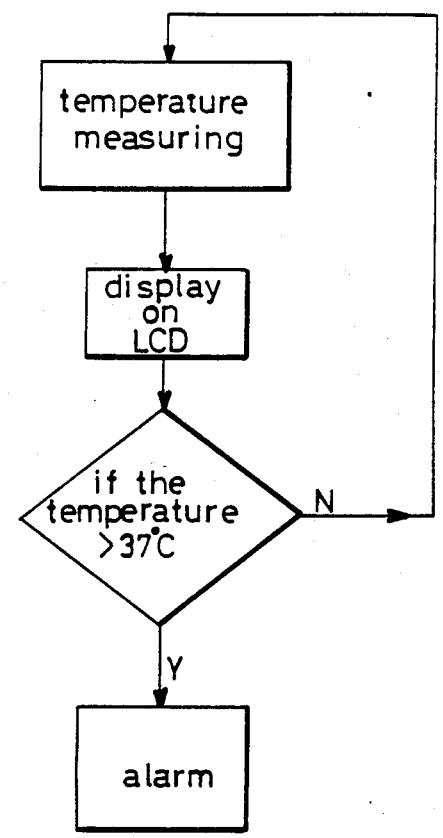
FIG. 1 is a flow chart illustrating the operation of a belted electronic display clinical thermometer constructed in accordance with the present invention.
Figure 2:
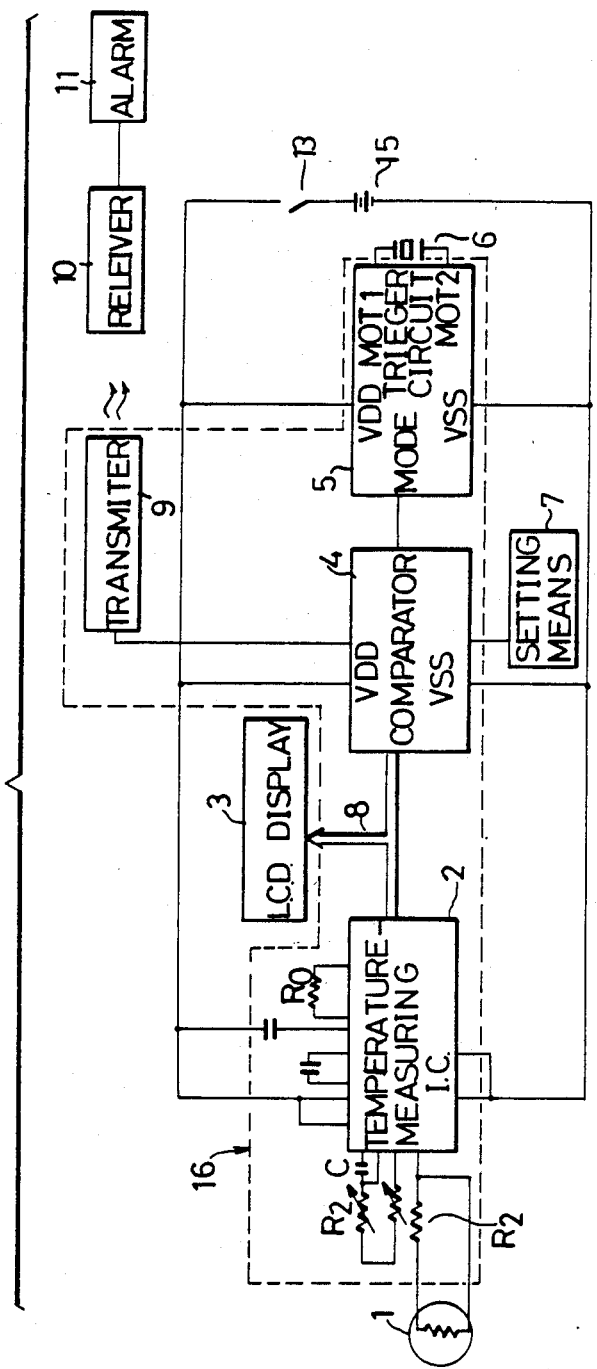
FIG. 2 is a simplified electrical circuit constructed in accordance with the present invention, and further illustrating an alternative embodiment of transmitter and remote receiver and alarm.

Referring to FIG. 1 and FIG. 2, it can be seen that a belted electronic display clinical thermometer with alarm in accordance with the present invention is composed of a thermal sensor 1, a temperature-measuring integrated circuit 2, an LCD display 3, a comparator 4, a trigger circuit 5 and an alarm 6. The thermal sensor 1 may be a thermal resistor which changes resistance according to temperature, so as to derive an internal signal proportional to temperature for the temperature measuring integrated circuit 2. The temperature-measuring integrated circuit 2 is a standard, commercially available integrated circuit. An exemplary integrated circuit 2 may be of the type produced by Toshiba Corporation of Japan, and has a designated Model Number JT6690-AS or Analog Devices of the United States under model designation AD596/AD597. The output of the temperature-measuring integrated circuit 2 is applied on a liquid crystal display (LCD) 3, which provides a readable indication of the measured temperature from the output signal in a conventional, known manner, via data bus 8 and simultaneously, is input to the comparator 4.

The comparator 4 typically a standard ICL7136 IC has preset a reference temperature value, such as 37 degrees centigrade, used for comparison with the measured temperature value. If the measured value is larger than the reference value, the comparator 4 will output a HIGH signal to the circuit trigger 5 so that the trigger circuit 5 generates an output signal to the alarm 6. Although any trigger circuit which functions as above described can be used, an exemplary trigger circuit 5 may be a common CMOS LSI circuit which contains an analog signal amplifier and frequency detector for generating output signals and related external components. A typical example of such would be the UM3611A IC by UMC of the United States, producing a frequency of approximately 18 KHZ to drive a piezo-buzzer used as the alarm 6.

Please note that the output of the comparator 4 also can be electrically connected to a transmitter 9 as shown in FIG. 2. After receiving the input signal, the transmitter 9 will emit a particular frequency signal, such as 32 MHZ, to be received by a remote receiver 10 installed at a location, for example 10 meters away. Such combination is especially suitable for monitoring a baby; i.e., the receiver 10 can be situated in another room such as the mother's room to provide a noticeable signal for the mother if the receiver 10 receives a signal from the transmitter 9 situated in the baby's room when the electronic clincal thermometer of this invention senses that the baby has a fever. The receiver 10 connects with a second alarm 11, which sounds when the receiver 10 has been activated. The transmitter/receiver system utilized above may be one of a type common to ultrasonic transmission. Since the transmitter/receiver system is well-known in the art, no further description need be set forth to enable one skilled in the art to practice the present invention.

The comparator 4 of this invention can also use a setting means 7, which includes an appropriate number of shift registers used for adjusting the reference value (temperature) of the comparator 4. By employing the setting means 7, the reference value of the clinical thermometer as per this invention can be re-set to detect variations in the individual's body temperature rather than from a preset value (temperature).

Figure 3:
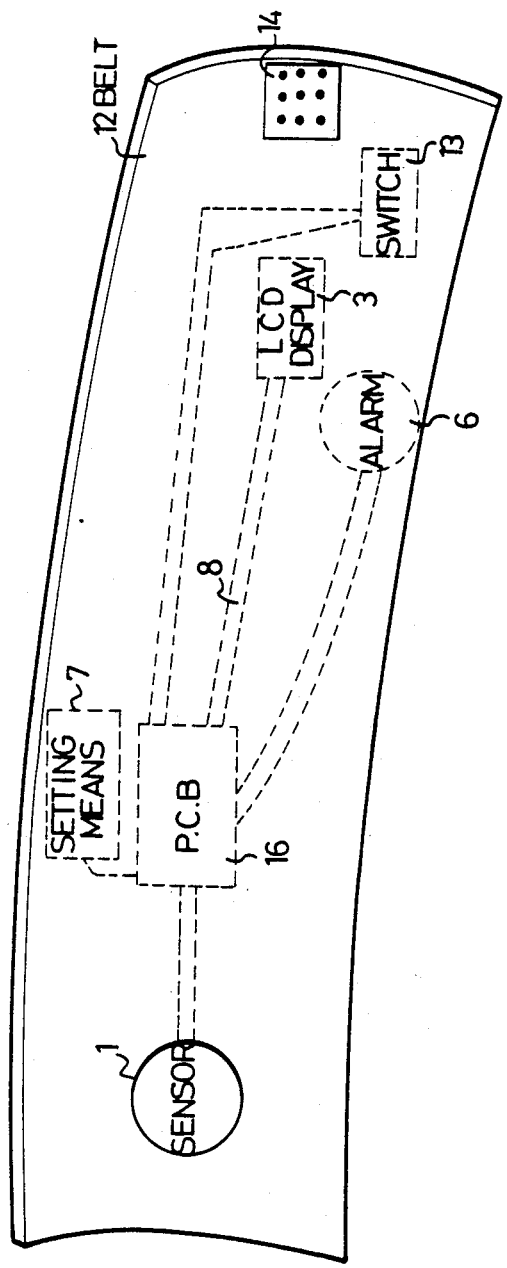
FIG. 3 shows a general arrangement of the elements composing this invention on a belt.

FIG. 3 shows the physical arrangement of the composed elements of this invention. The belt 12 is made of flannel, or the like, and comprises a fixing means 14. The fixing means 14 is composed of a pair of Velcro (trademark name) strips or plastic hooks or the like for fixing the belt 12 of the invention when it is wound on the arm of a user. Reference number 13 represents an electrical switch. The temperature-measuring integrated circuit 2, the comparator 4, the trigger circuit 5 and the transmitter 9 are all installed on the printed circuit board pointed circuit board (PCB) 16 and further, the alarm 6, the LCD display 3, the thermal sensor 1 and the electrical switch 13 are separately installed on the belt 12 of this invention. Especially note that the thermal sensor 1 should be installed on the inner face of the belt 12 so that it can touch the skin of the user. The LCD display 3 and the electrical switch 13 are installed on the outside of the belt 12 for accessibility and visibility, respectively. Further, a battery 15 (shown in FIG. 2) for providing the circuit with electrical power is "snapped" to the PCB 16.

According to the above description, it is obvious that this invention is applicable to different kinds of patients, especially applicable to babies or seriously ill or disabled patients who must have continuous care and monitoring. The belted electronic display clinical thermometer of this invention is also convenient and comfortable to use. As various possible embodiments might be made of the above invention, it is to be understood that all matter herein described or shown in the accompanying drawings is to be interpreted as illustrative and not in a limiting sense. Thus it will be appreciated that the drawings are exemplary of a preferred embodiment of the invention.

I claim:

1. A belted electronic display clinical thermometer adopted for being secured about an arm of a person comprising:
   a belt having an inner face, an outer face and means for fixing said belt about an arm of a user;
   a thermal sensor mounted on said inner face to be held adjacent said arm, said thermal sensor having a resistance in proportion to a temperature of said arm to derive an internal signal proportional to said temperature of said arm;
   a temperature measuring integrated circuit, said internal signal being applied to said temperature measuring integrated circuit, said temperature measuring integrated circuit developing an output signal corresponding to said temperature in response to said input signal;
   a liquid crystal display to which said output signal is applied to provide a readable indication of said temperature;
   a comparator to which said output signal is applied to compare said temperature to a preset reference temperature, said comparator developing a high signal when said temperature exceeds said reference temperature;
   a trigger circuit responsive to said high signal to develop an analog output signal; and
   an alarm for sounding an audible signal response to said analog output signal.

2. A belted electronic display clinical thermometer, as claimed in claim 1, wherein said belt is made of flannel or the like.

3. A belted electronic display clinical thermometer, as claimed in claim 1, further comprising setting means for adjusting said reference temperature.

4. A belted electronic display clinical thermometer as claimed in claim 1, further comprising:
   a transmitter mounted on said belt, said transmitter emitting a particular frequency signal in response to said high signal developed by comparator;
   a remote receiver to detect said particular frequency signal and to develop a second analog output signal;
   and a remote second alarm for sounding an audible signal in response to said second analog output signal.

* * * * *